US010996964B2

(12) United States Patent
Renner et al.

(10) Patent No.: US 10,996,964 B2
(45) Date of Patent: May 4, 2021

(54) VIRTUAL ENDPOINT SOFTWARE SYSTEM

(71) Applicant: HEWLETT PACKARD ENTERPRISE DEVELOPMENT LP, Houston, TX (US)

(72) Inventors: Ryan A. Renner, Ft. Collins, CO (US); John Raftery, Galway (IE); Veena S. Begar, Alpharetta, GA (US); Michael J. Grimm, Ft. Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 114 days.

(21) Appl. No.: 16/144,866

(22) Filed: Sep. 27, 2018

(65) Prior Publication Data
US 2020/0104149 A1    Apr. 2, 2020

(51) Int. Cl.
*G06F 11/00*    (2006.01)
*G06F 9/455*    (2018.01)
*G06F 11/07*    (2006.01)

(52) U.S. Cl.
CPC .......... *G06F 9/455* (2013.01); *G06F 11/0712* (2013.01); *G06F 11/0751* (2013.01); *G06F 11/0778* (2013.01)

(58) Field of Classification Search
CPC .. G06F 9/455; G06F 11/0778; G06F 11/0751; G06F 11/0712
USPC .......................................................... 714/45
See application file for complete search history.

(56) References Cited

U.S. PATENT DOCUMENTS

| | | | |
|---|---|---|---|
| 2009/0083400 A1* | 3/2009 | Draca | H04L 41/028 709/220 |
| 2011/0209064 A1* | 8/2011 | Jorgensen | G06F 9/452 715/733 |
| 2016/0065653 A1 | 3/2016 | Chen et al. | |
| 2016/0132214 A1* | 5/2016 | Koushik | G06F 9/455 715/741 |

(Continued)

OTHER PUBLICATIONS

Wikipedia, "Internet of things", available online at <https://en.wikipedia.org/wiki/Internet_of_things>, 34 pages.
(Continued)

*Primary Examiner* — Yair Leibovich
(74) *Attorney, Agent, or Firm* — Hewlett Packard Enterprise Patent Department

(57) ABSTRACT

The present disclosure provides a virtual endpoint software system. The virtual endpoint software system may be implemented by a computing system comprising a workstation, processors, and memory. The computing system being configured to instantiate a virtual endpoint software system. The virtual endpoint software system comprises a virtual endpoint tool. The virtual endpoint tool comprises a plurality of virtual endpoint devices wherein each virtual endpoint device is a digital representation of a hardware endpoint device. Each of the plurality of virtual endpoint device is associated with at least one of a plurality of configuration files. In some implementations, each configuration file when executed virtually represents the device functionality and operating conditions of the hardware endpoint device. In addition, the virtual endpoint tool comprises a central engine wherein the central engine comprises at least one processor to process instructions stored in the plurality of configuration files.

17 Claims, 5 Drawing Sheets

(56) References Cited

U.S. PATENT DOCUMENTS

2018/0063250 A1    3/2018  Justin et al.
2020/0319910 A1*  10/2020  Dai ........................ H04L 12/185

OTHER PUBLICATIONS

Bevywise.com; "Iot Simulator"; 49 pages; printed on: May 22, 2019; from: https://www.bevywise.com/iot-simulator/help-document/#tab-3.
https://Iotify.help/; "Develop Iot Applications with Virtual Devices"; 7 pages; printed on May 22, 2018; from: https://iotify.help/.
Senior, S.; "Iot Device Simulator"; May 2008; 23 pages.
Pflanzner, T. et al.; "Mobiotsim: Towards a Mobile Iot Device Simulator"; 7 pages; printed on May 31, 2016 from: http://publicatio.bibl.u-szeged.hu/11702/1/mobiotsim_ficloud_accepted_u_.pdf.
Gambit Communications, Inc., "Mimic IoT Simulator—MQTT, CoAP, Modbus, HTTP, HTTPS, REST", 3 pages, Jul. 7, 2017; retrieved from Internet Archive Wayback Machine <https://web.archive.org/web/20170707234440/http://www.gambitcomm.com/site/iot_simulator.php#> on Dec. 14, 2020.
Gambit Communications, Inc., "MIMIC® SNMP Simulator," Web page <http://ww.gambitcomm.com/site.snmp-simulator.php>, 5 pages, Jul. 8, 2017, retrieved from Internet Archive Wayback Machine <https://web.archive.org/web/20170708160618/https://www.gambitcomm.com/site/snmp-simulator.php#> on Dec. 14, 2020.
Gambit Communications, Inc., "MIMIC—SNMP-Based Simulation of Enterprise Networks," 4 pages, Nov. 18, 2017; retrieved from Internet Archive Wayback Machine <https://web.archive.org/web/20171118154247/https://www.gambitcomm.com/site/pdf/products/brochure.pdf> on Dec. 14, 2020.

* cited by examiner

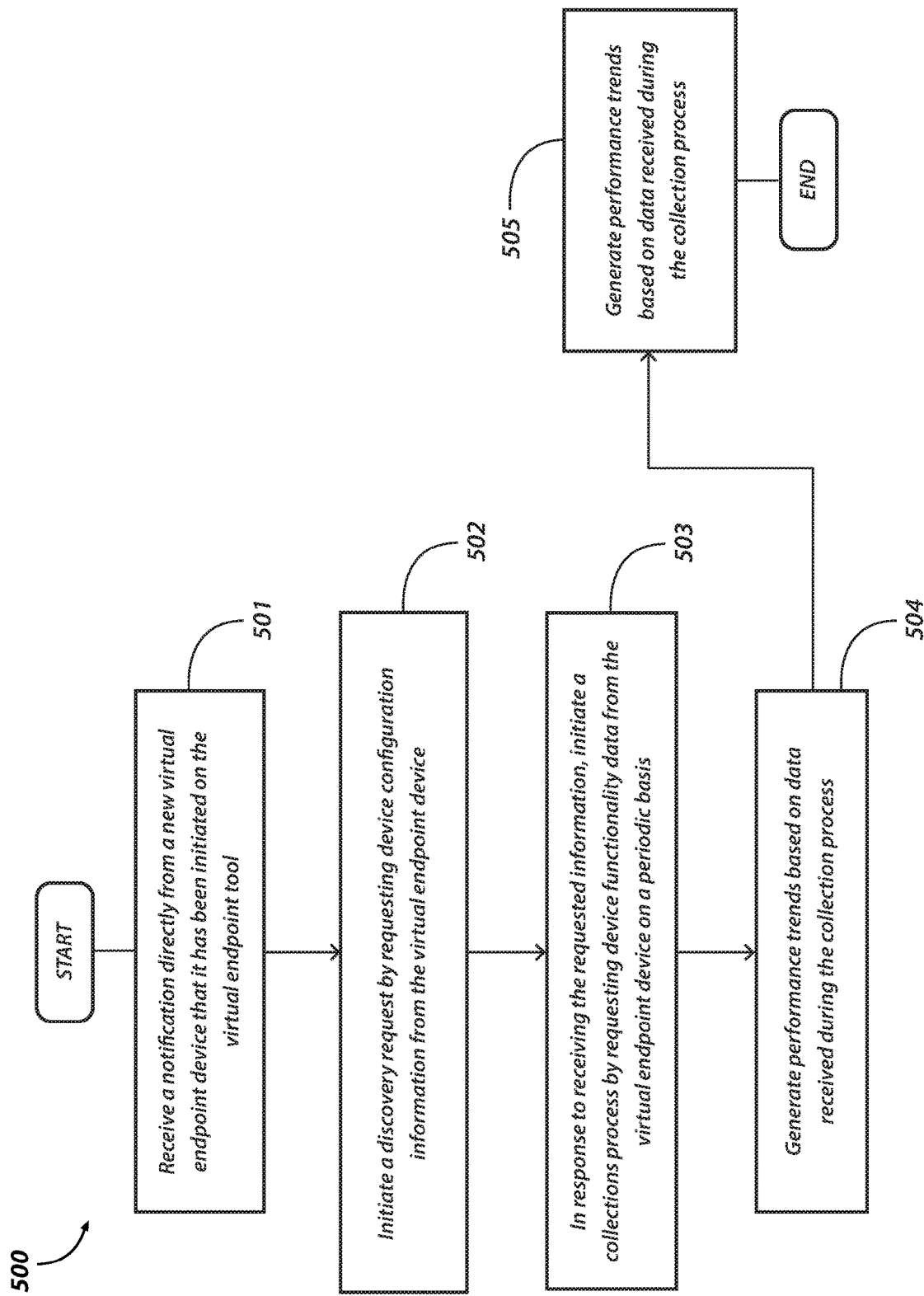

VIRTUAL ENDPOINT SOFTWARE SYSTEM

BACKGROUND

Remote support systems of hardware endpoint devices monitor device functionality and respond to devices faults. Remote support systems typically monitor computer network devices (e.g., servers, network switches, etc.) and are sync'd to one or more hardware endpoint devices over a network at all times. Remote support systems are also be configured to operate with device data which can be analyzed to improve device performance. Remote support systems are typically configured to function for specific hardware endpoint devices. When new devices are made available, remote support systems are re-configured to work with these devices as well. As there is a wide array of hardware devices that can be monitored a remote support system for the various hardware device can be typically a costly endeavor.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 5 is a flowchart of a method of implementing a direct connect communications protocol within a virtual endpoint software system according to one embodiment of the present disclosure.

DETAILED DESCRIPTION

The description of the different advantageous embodiments has been presented for purposes of illustration and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Before the present disclosure is described in detail, it is to be understood that, unless otherwise indicated, this disclosure is not limited to specific procedures or articles, whether described or not. It is further to be understood that the terminology used herein is for the purpose of describing particular embodiments only and is not intended to limit the scope of the present disclosure.

It must be noted that as used herein, and in the claims, the singular forms "a," and "the" include plural referents unless the context clearly dictates otherwise.

However, employing remote support systems to monitor device performance and collect performance data has inherent challenges. Primarily, the expensive burden to test and develop support tools for the vast number of hardware devices that can be supported by remote support systems is unsustainable. In addition, as new devices are constantly introduced into the marketplace to replace legacy systems, remote support systems require perpetual updating to effectively manage new and old device configurations. A need therefore exists for a reliable system to mimic and virtualize a wide variety of endpoint devices without bearing significant overhead costs.

The present disclosure provides a virtual endpoint software system. The virtual endpoint software system may be implemented by a computing system comprising a workstation, processors, and memory. The computing system being configured to instantiate a virtual endpoint software system. The virtual endpoint software system comprises a virtual endpoint tool. The virtual endpoint tool comprises a plurality of virtual endpoint devices wherein each virtual endpoint device is a digital representation of a hardware endpoint device. Each of the plurality of virtual endpoint device is associated with at least one of a plurality of configuration files. In some implementations, each configuration file when executed virtually represents the device functionality and operating conditions of the hardware endpoint device. In addition, the virtual endpoint tool comprises a central engine wherein the central engine comprises at least one processor to process instructions stored in the plurality of configuration files.

Figure 1B:
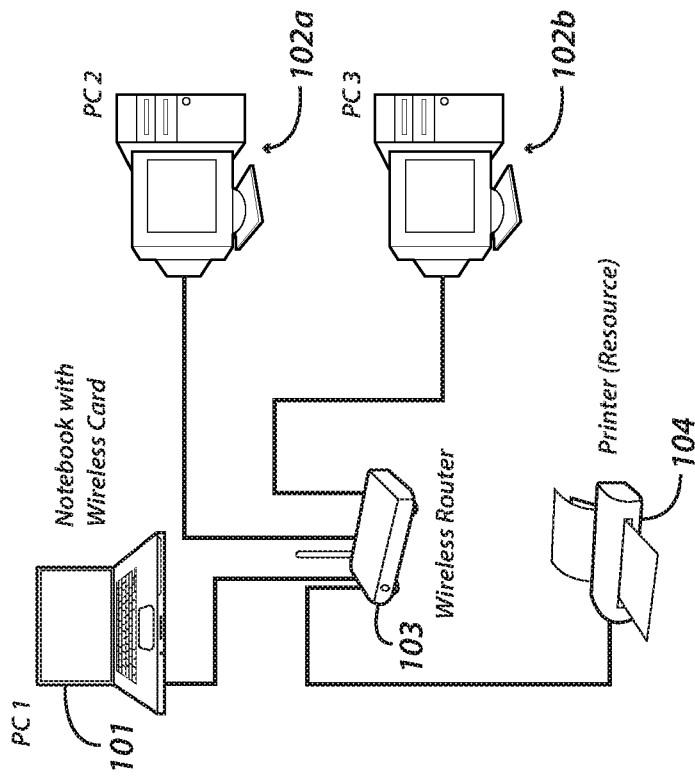
FIGS. 1A and 1B are illustrations of hardware endpoint systems.
Figure 1A:
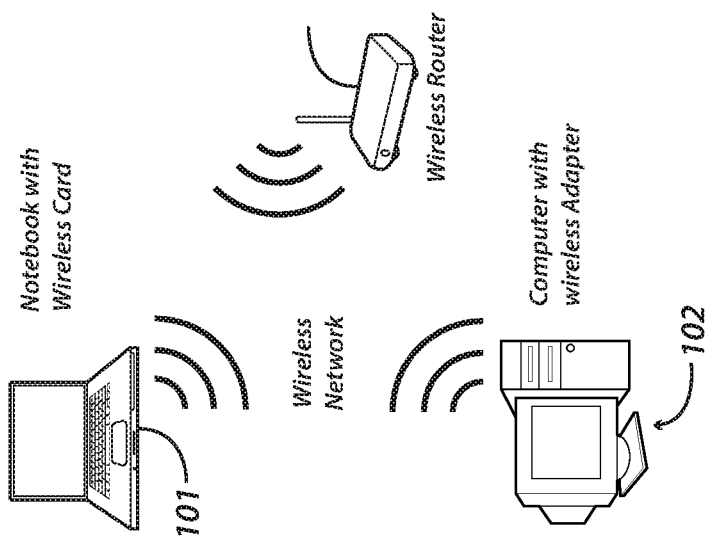

FIGS. 1A and 1B are illustrations of hardware endpoint devices. Exemplary hardware endpoint devices include, but are not limited to, a laptop computer (e.g., notebook) 101, personal computer 102, wireless router 103, and printer 104 all having network capability. These exemplary endpoint devices may be connected together on a network 100 as shown in FIG. 1B. Challenges may arise when attempting to accommodate monitoring and support of hardware endpoint devices as they may vary greatly according to model, device type, and communications protocol.

The present disclosure provides a virtual endpoint software system which comprises at least one virtual endpoint tool and a remote support system. Herein, a virtual endpoint tool or "VET" is a virtual endpoint device representation of a plurality of hardware endpoint devices. Notably, a virtual endpoint tool can mimic a vast array of hardware endpoint devices.

In one embodiment, a virtual endpoint tool can mimic the hardware endpoint devices with regards to device functionality and operating conditions (e.g., by way of implementing any of a plurality of virtual endpoint devices). The hardware endpoint devices digitally represented may include various known virtualized hardware device instantiations such as, but not limited to, a server, disk array, switch, router, etcetera.

In some embodiments of the present disclosure, a virtual endpoint tool has access to a plurality of configuration files. Each configuration file can be associated with a virtual endpoint device which includes digital representations of hardware functionality and operating conditions of specific hardware endpoint devices. In one embodiment, a virtual endpoint device is instantiated when a virtual endpoint tool executes a configuration file such that the device functionality and operating conditions of a hardware endpoint device is digitally represented. In addition, a virtual endpoint tool is capable of creating a large array of virtual endpoint device instantiations by executing the particular configuration files associated with the virtually represented hardware endpoint devices.

Notably, the virtual endpoint software system disclosed herein is configured such that the virtual endpoint devices (and/or virtual endpoint tool) can effect discovery, collections, and fault recovery as described in more detail below.

One having ordinary skill in the art should appreciate that the one or more virtual endpoint devices can be implemented simultaneously as the instantiations of the virtual endpoint devices are generated by a software application in accordance with one embodiment of the present disclosure.

Figure 2:
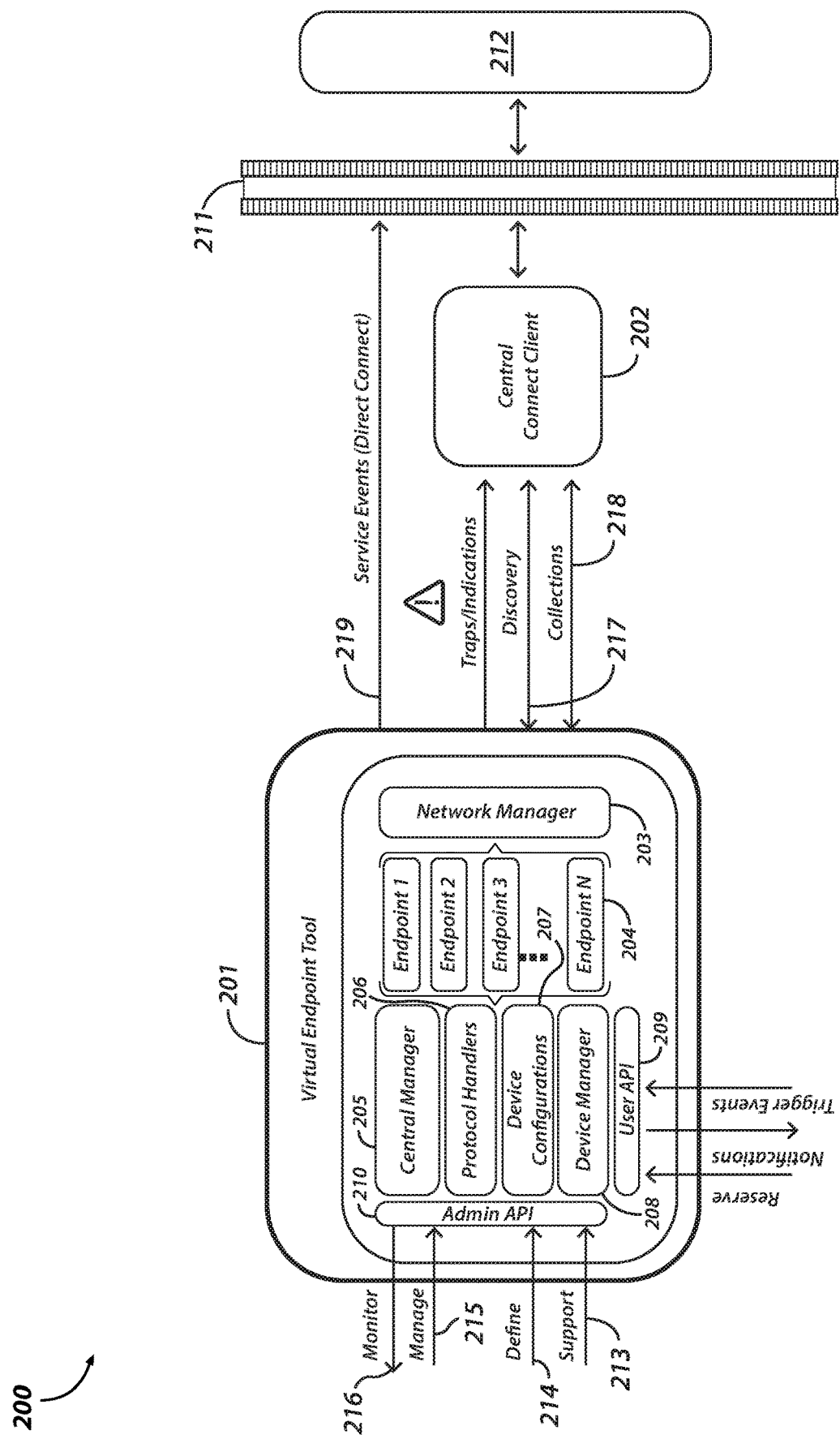
FIG. 2 is an illustration of a virtual endpoint software system according to one embodiment of the present disclosure.

FIG. 2 is an illustration of a virtual endpoint software system 200 according to one embodiment of the present disclosure. The virtual endpoint software system 200 may include a workstation, one or more processors, and computer memory. In one embodiment, when the virtual endpoint software system 200 comprises a virtual endpoint tool 201, the virtual endpoint tool 201 includes a workstation, one or more processors, and computer memory.

As illustrated, virtual endpoint software system 200 comprises a virtual endpoint tool 201, a central connect client 202, and a remote support system 212. In some implementations, the central connect client 202 is a module of the remote support system 212. In yet other implementations, the central connect client 202 is an external module of the virtual endpoint tool 201.

Virtual endpoint tool 201 can communicate (e.g., in response to a discovery or collection request) with remote support system 212 by way of a direct connection (direct connect 219). Alternatively, a virtual endpoint device 204 can be configured to respond to discovery and collection requests via the central connect client 202. Accordingly, one or more virtual endpoint devices hosted by a virtual endpoint tool 201 can be configured to communicate with the remote support system 212 directly while other virtual endpoint devices hosted on the virtual endpoint tool are configured to communicate with the remote support system 212 via the central connect client 202. In some embodiments, most of the virtual endpoint devices 204 hosted on the virtual endpoint tool 201 communicate with the remote support system 212 via the central connect client 202. As such, in some embodiments, the virtual endpoint devices are configured such that their default communications protocol is to communicate with the remote support system 212 via the central connect client 202.

As such, the central connect client 202 is configured to receive messages, notifications, and updates from the virtual endpoint devices 204, virtual endpoint tool 201, and the remote support system 212. In some implementations, the central connect client 202 can filter requests sent from the remote support system 212 for specific information from a virtual endpoint device 204 according to a pre-defined filter policy. In some implementations, the pre-defined filter policies may be applicable to some or all of the virtual endpoint devices 204 hosted on the virtual endpoint tool 201. Accordingly, the central connect client 202 can employ filter policies that are customized for an individual or set of virtual endpoint devices 204.

In one example, if a remote support system 212 requests information from a virtual endpoint device 204 that is prohibited, the central connect client 202 can deny the request in full or in part and can send a notification to the requester (e.g., remote support system 212) that the request violates one or more policies. Likewise, the central connect client 202 can deny in full or in part information from being sent from a virtual endpoint device 204 to the remote support system 212 with the addition of a notification indicating the denial.

The virtual endpoint tool 201 and the remote support system 212 may be on the same network 220 or may be on different networks that are communicatively coupled together (e.g., by a switch 211, network bridge, or another suitable network device). Although a single virtual endpoint tool 201 is shown in the virtual endpoint software system 200, additional virtual endpoint tools 201 can be hosted as well.

Virtual endpoint tool 201 can include several sub-modules to simulate the operating environment of various hardware endpoint devices digitally represented by the virtual endpoint tool 201. The virtual endpoint device instantiations are deployed by executing one or more configuration files that are assigned to each hardware endpoint device representation. In some implementations, the virtual endpoint tool 201 has access to memory to record performance data associated with each virtual endpoint device 204 hosted thereon. In response to a fault, the virtual endpoint tool 201 can send the historical performance data associated with a particular virtual endpoint device 204 to the central connect client 202 and the remote support system 212.

The configuration files may include a plurality of parameters associated with device functionality and operating conditions of the virtualized hardware endpoint device. Each virtual endpoint device 204 is associated with configuration files, data files, API's, and communications protocols. In some implementations, several configuration files are associated with and assigned to a single virtual endpoint device which varies slightly such as the virtualized device functionality and operating conditions may be similar.

In addition, as illustrated in FIG. 2, virtual endpoint tool 201 comprises a plurality of modules that perform specific sets of tasks such that the virtual endpoint tool 201 can simulate the device functionality and operating conditions for the virtual representation of the hardware endpoint devices. The virtual representation of the hardware endpoint devices can be employed in a computing system which includes a computer workstation that is equipped with a graphical user interface, microprocessors, and computer memory.

For example, virtual endpoint tool 201 may include a device manager 208. Device manager 208 manages reservations, notifications, and event triggering for the virtual endpoint tool 201 and for any individual virtual endpoint device 204 hosted by the virtual endpoint tool 201. Virtual endpoint tool 201 also includes a central manager module 205 which manages communications between protocol handlers 206 and destination endpoints (e.g., remote support system 212). In addition, protocol handler module 206 accommodates communications for a plurality of protocols for endpoint IP destinations. Exemplary protocols include, but are not limited to, Web-Services Management (WS-Man), Simple Network Management Protocol (SNMP), Web-based enterprise management (WBEM), Windows Management Infrastructure (WMI), Extended Link Monitor Channel (ELMC), and Embedded Support Automation (ESA), Serial Storage Architecture (SSA), Hypertext Transfer Protocol (HTTP), Telnet, and Java™. In addition, protocol handler module 206 includes libraries (e.g., Dynamic-link library) and has access to shared libraries.

Further, device configurations module 207 includes digital representations of endpoint IP addresses, protocols, collectable data, and events. A network manager module 203 includes virtual IP addresses and routing support associated with the virtual endpoint tool 201 or specifically any virtual endpoint device 204.

In addition, virtual endpoint tool 201 can include various user API's 209 and administrator API's 210 which support command line, graphical, or programmatic interaction with the virtual endpoint tool 201. Accordingly, virtual endpoint tool 201 allows users to make reservations and set triggers for events associated with the virtual endpoint tool 201. In addition, the virtual endpoint tool 201 allows administrators to support 213, define 214, manage 215, and monitor 216 the administrative API's.

Virtual endpoint tool 201 also includes one or more computer processors to execute instructions stored in computer memory. In one embodiment, one or more of the computer processors function as a central engine that processes instructions associated with internal requests associated with a virtual endpoint device 204. Remote support system 212 may also include access to a datacenter which stores collection, discovery, and other information retrieved from the virtual endpoint devices, virtual endpoint tools, or central connect clients. Lastly, a central engine processes internal and external network requests from the remote support system 212 in accordance with one embodiment of the present disclosure.

In one embodiment of the present disclosure, remote support system 212 collects information from each of the hosted virtual endpoint devices 204 on a routine basis. In addition, the remote support system 212 can request information from a virtual endpoint device 204 in response to being notified of a fault condition that exists with one or more virtual endpoint devices.

In one implementation, a virtual endpoint device 204 sends a notification to the central connect client 202 or the remote support system 212 that a fault condition exists. In response, the central connect client 202 or remote support system 212 can effect a collections process to obtain the operating conditions that caused the fault condition. In addition, a collections request can also include records of historical performance of the virtual endpoint device 204.

The virtual endpoint tool 201 communicates with the remote support system 212 over a network 220. After a new virtual endpoint device 204 is added to the virtual endpoint tool 201, the virtual endpoint device 204 (via the VET 201) can send a notification directly to remote support system 212 informing the remote support system 212 about the addition of the virtual endpoint device 204. In some implementations, the aforementioned communication protocol describes a direct connect 219 protocol.

The remote support system can initiate a "discovery request" 217 by sending messages to the virtual endpoint device 204 inquiring about the device's identifying and configuration information (e.g., assigned IP address, hostname, etc.). Furthermore, the remote support system 212 can initiate a "collections process" 218 to obtain device functionality and operating conditions associated with a virtual endpoint device 204.

Herein, a discovery request 217 includes inquiries for basic identifying and configuration information associated with a specific virtual endpoint device. The discovery request 217 may be translated according to a communications protocol employed by the virtual endpoint device 204 before the response is received by the virtual endpoint device 204. A discovery request 217 may be performed when a virtual endpoint device 204 is added to the virtual endpoint tool 201.

In some embodiments, when a virtual endpoint device 204 is configured to have a direct connection with remote support system 212, a discovery request may include a "discovery initiation" process. A discovery initiation may consist of the virtual endpoint device 204 (or virtual endpoint tool 201) sending a notification to the remote support system 212 to inform that the virtual endpoint device 204 has been recently added to the virtual endpoint tool 201 and further instructions for the remote support system 212 to locate the device 204.

In some embodiments, direct connect devices have access to the IP address of the remote support system 212 and the capability to communicate with the remote support system 212 according to a communications protocol employed by the remote support system 212. In addition, the discovery initiation notification may also include a request for the remote support system 212 to locate the virtual endpoint device 204.

In response to the discovery request 217, the virtual endpoint device 204 (or virtual endpoint tool 201) sends identifying and configuration information associated with the virtual endpoint device 204 (e.g., protocol information, device type, and other information). As a result of the discovery process, a record of the virtual endpoint device 204 is made in the remote support system 212 and may therefore be accessed by a user and displayed via a graphical user interface component of a workstation.

In an alternate embodiment, when a virtual endpoint device 204 is configured to send and receive information via the central connect client 202, a user may inform the central connect client 202 that a new virtual endpoint device 204 has been added to the virtual endpoint device 201 and to locate the device 204. The user may include the IP address of the new virtual endpoint device 204 and the communications protocol employed by the new virtual endpoint device 204. Further, the central connect client 202 can send a discovery request to the new virtual endpoint device 204 to respond with the virtual endpoint device's 204 identifying and configuration information. As a result of the discovery process, a record of the virtual endpoint device 204 is made by the central connect client 202 and may be accessed by a user and displayed by a graphical user interface component of a workstation.

In yet another implementation, the central connect client 202 can be configured to poll or scan the virtual endpoint tool 201 on a periodic basis to determine whether a new virtual endpoint device 204 has been added. As such, in this implementation, manual intervention by a user is not needed for the central connect client 202 to initiate discovery. In an event that the virtual endpoint tool 201 indicates that a new virtual endpoint device 204 has been added in response to a scan, the central connect client 202 can perform discovery on the new virtual endpoint device 204.

After discovery, a collections process 218 may be performed on the virtual endpoint devices 204 hosted by the virtual endpoint tool 201. Herein, a collections process 218 includes inquiries as to device functionality and operating conditions associated with a set of simulated conditions for the virtual endpoint devices 204. A collections process 218 may be performed by the central connect client 202 or the remote support system 212 on a periodic basis.

Figure 3:
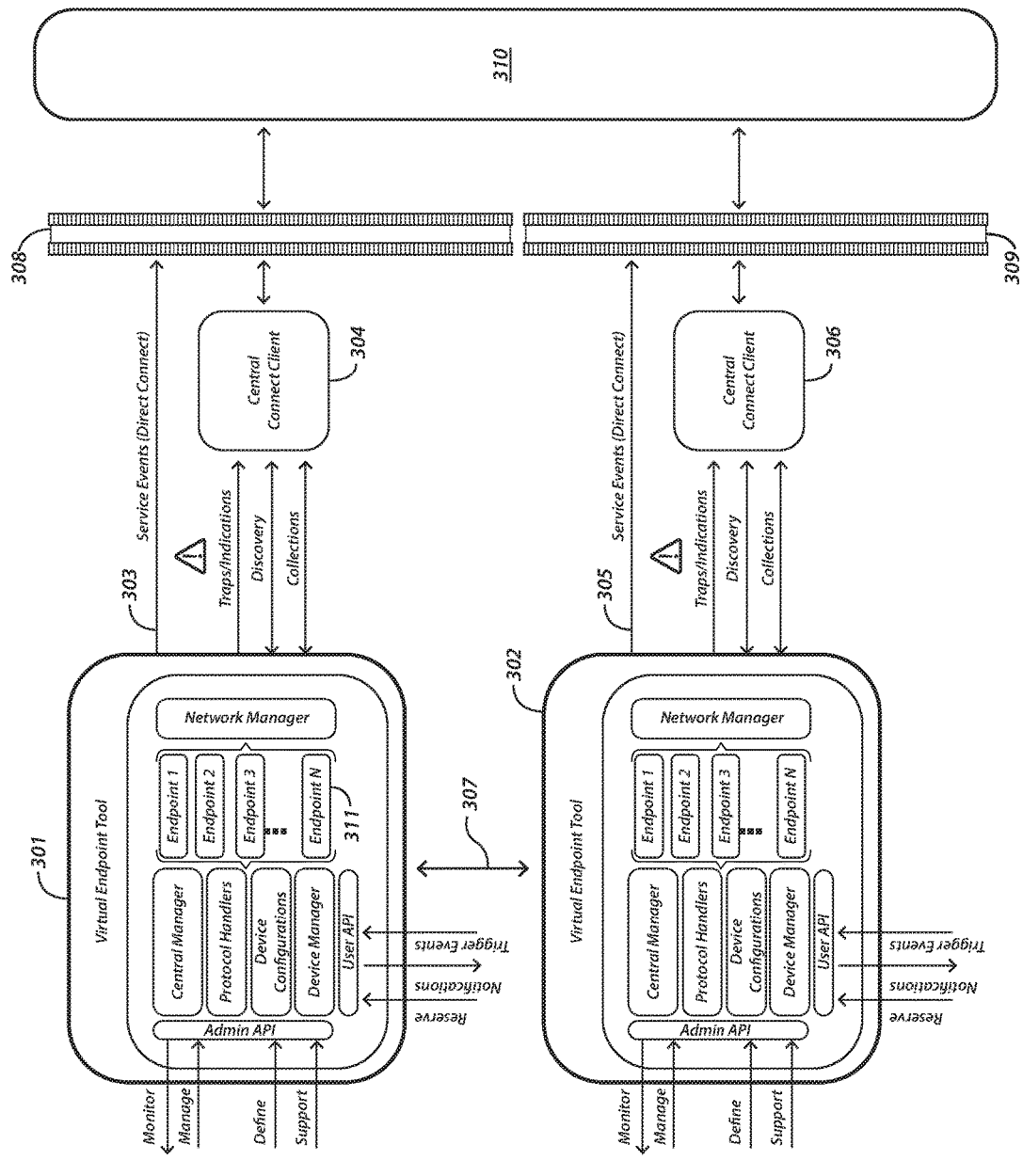
FIG. 3 is an illustration of a virtual endpoint software system which hosts several virtual endpoint tools according to one embodiment of the present disclosure.

FIG. 3 is an illustration of a virtual endpoint software system 300 which comprises several instances (e.g., VET's 301, 302) of a virtual endpoint tool which hosts a plurality of virtual endpoint devices. Virtual endpoint tools 301, 302 may be configured similarly to the virtual endpoint tool 201 referenced in FIG. 2. In some implementations, virtual endpoint tools 301, 302 can communicate (via communication links 307) with one another.

Although virtual endpoint software system 300 hosts two virtual endpoint tools 301, 302, one having ordinary skill in the art should appreciate that virtual endpoint software system 300 can host more than or less than the two virtual endpoint devices 301, 302 shown in FIG. 3.

In some embodiments of the present disclosure, each virtual endpoint tool can host virtual endpoint devices which are directed to specific categories of virtual hardware endpoint devices (e.g., virtual endpoint devices). For example, virtual endpoint tool 301 can host virtual representations of enterprise hardware devices. Contrariwise, the virtual endpoint tool 302 can host virtual representations of consumer products (e.g., printers, laptops, etc.).

Virtual endpoint tool 301 can communicate directly with a remote support system 310 via one or more networks 308 by way of a direct connection 303. In addition, virtual endpoint tool 302 can communicate with a remote support system 310 via one or more networks 309 by way of a central connect client 304. Likewise, virtual endpoint tool 302 can communicate directly with remote support system 310 via a direct connection 305 or by way of a central client connect 306. In addition, virtual endpoint tools 301, 302 can have configuration files that employ the instantiation and simulation of two or more virtual endpoint devices simultaneously.

Figure 4:
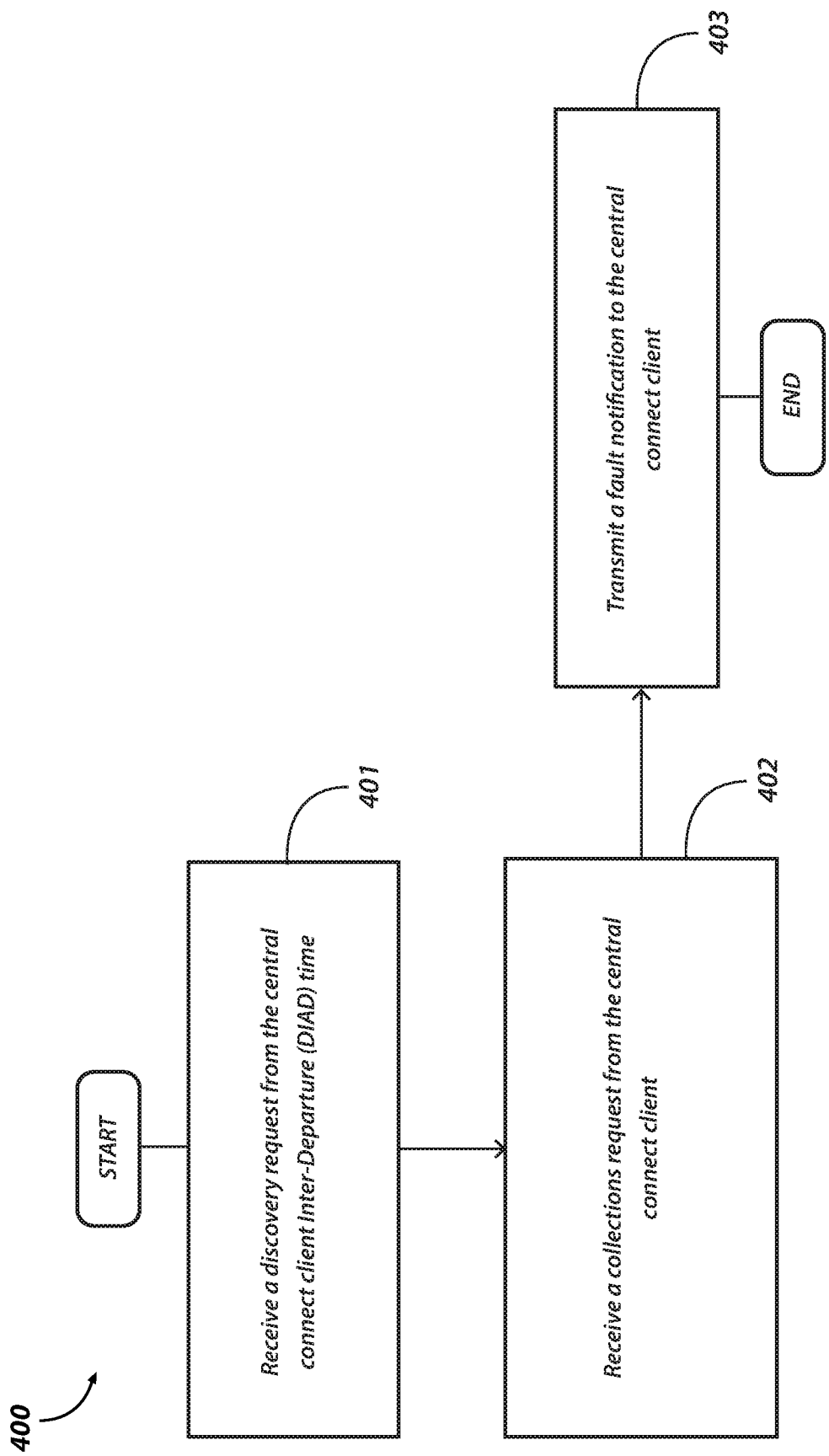
FIG. 4 is a flowchart of a method of implementing a central connect client within a virtual endpoint software system according to one embodiment of the present disclosure.

FIG. 4 is a flowchart 400 of one method of implementing the virtual endpoint software system described herein. Flowchart 400 begins with receiving a discovery request from the central connect client (block 401). The discovery request is received at a virtual endpoint tool and is intended for a particular virtual endpoint device. In some implementations, the discovery request is intended for two or more virtual endpoint devices hosted on a particular virtual endpoint tool. The information sent in response to the discovery request may include identifying and configuration information (e.g., an IP address, device type information, model type, the device host name, protocol information, etcetera).

In some implementations, the central connect client is informed of certain identifying information initially and therefore sends a request for additional identifying and configuration information about the virtual endpoint device (or several virtual endpoint devices) from the virtual endpoint tool. After the requested information is received at the central connect client, the central connect client may forward the information to the remote support system in accordance with one or more pre-defined policies according to one implementation.

Next, the method proceeds with receiving a collections request from the central connect client (block 402). The collections request may be intended for one or more virtual endpoint devices hosted on a virtual endpoint device. The collections request may include querying a virtual endpoint device for the virtual endpoint device's present operating conditions. In some implementations, the collections request may be first intercepted by a central connect client that forwards the request to the virtual endpoint tool after first confirming that the request meets certain policies.

For example, the central connect client can determine whether the virtual endpoint tool hosts a particular virtual endpoint device. If the virtual endpoint tool hosts the virtual endpoint device, a central engine (e.g., one or more processors) processes the collections request by retrieving the requested information. In some implementations, the requested information is transmitted to the remote support system by the central connect client after the information is retrieved from the virtual endpoint tool.

Further, transmitting a fault notification to the central connect client (block 403). The central connect client may respond to fault notifications associated with the virtual endpoint device. For example, the central connect client can initiate a collections request to seek the operating conditions and device configuration associated with the fault in addition to records of past performance of the virtual endpoint device. The central connect client may forward the retrieved information to a remote support system such that this data may be analyzed to improve the hardware endpoint device (s) represented by the virtual endpoint device.

In some implementations, when the virtual endpoint device transmits a fault notification, the computing system which hosts the virtual endpoint software system may issue an alert that is visualized on a graphical user interface or other peripheral device component of the computing system. The alerts may gain the attention of a user which may analyze the causes of the faulting condition.

FIG. 5 is a flowchart 500 of a method of implementing a direct connect communication protocol within a virtual endpoint software system according to one embodiment of the present disclosure. Flowchart 500 begins with receiving a notification that a new virtual endpoint device has been added to a virtual endpoint tool (block 501). In one implementation, the virtual endpoint device can communicate directly with the remote support system via a direct connection.

A discovery request can be initiated by requesting device configuration information from the virtual endpoint device (block 502). The information requested may be customized for a specific device type and/or device model. The discovery request can be sent directly to the virtual endpoint tool which hosts the virtual endpoint device.

Further, in response to receiving the requested information, initiating a collections process by requesting device functionality data from the virtual endpoint device (e.g., on a periodic basis) (block 503). The information requested during the collections process can be customized for a specific device type or device model. In addition, the collections process can include requests for historical performance data.

The method proceeds with generating performance trends based on data received during the collections process (block 504). In one implementation, the remote support system generates statistical analytics from the historical performance data and other collected data such that future performance trends can be predicted. The generated statistical analytics may provide insight into how a hardware endpoint device functions over a pre-determined period of time.

In some implementations, the statistical analytics generated from the historical performance data can be used to determine rate of a hardware endpoint device being simulated by a virtual endpoint device within a virtual endpoint software system. As known in the art, the failure rate of a hardware endpoint tool may depend on time, with the rate varying over the life cycle of the system. In some implementations, the mean time between failures (MTBF, $1/\lambda$) is may be employed instead of the failure rate.

The failure rate can be defined as the total number of failures of the hardware endpoint device amongst a plurality of active hardware endpoint devices, divided by the total time expended by that plurality of active hardware, during a particular measurement interval under stated conditions.

Erroneous expression of the failure rate could result in incorrect perception of the measure, especially if it would be measured from repairable systems and multiple systems with non-constant failure rates or different operation times. The failure rate can be defined with the aid of the reliability function, also called the survival function, R(t), the probability of no failure before time t. The failure rate can be expressed as:

$h(t)=f(t)/R(t)$, where f(t) is the time to (first) failure distribution (i.e., the failure density function) and $R(t)=1-F(t)$.

$h(t)=R(t_1)-R(t_2)/(t_2-t_1)*R(t_1)=R(t)-R(t+\Delta t.)/\Delta t.*R(t)$ over a time interval $(t_2-t_1)$ from $t_1$ (or t) to $t_2$ and $\Delta t$. In some implementations, this is a conditional probability, where the condition is that the failure has not occurred at time t. Hence the R(t) in the denominator. Accordingly, failure rates can be generated for each hardware endpoint device represented by a virtual endpoint device.

Lastly, responding to a fault condition associated with the virtual endpoint device (block 505). Faults can be "hard-wired" into configuration files associated with a virtual endpoint device. The faults can be included as instructions in the configuration file or can be included within a script that is accessible by the configuration file (e.g., a subroutine) or can be coded into the configuration file explicitly.

In one implementation, instructions which cause a fault to the virtual endpoint device reflects a faulting condition of the corresponding hardware endpoint device. The fault instructions may constitute parameter values of device functionality and operating conditions. The virtual endpoint tool can send notifications to the remote support system that a fault condition is associated with one or more virtual endpoint devices. Upon receiving the notification, the remote support system can attempt to discover the fault associated with one or more virtual endpoint devices and send requests to obtain the operating and device configurations that led to the fault.

The remote support system may respond to fault notifications associated with the virtual endpoint device. For example, the remote support system can initiate a collections request to seek the operating conditions and device configuration associated with the fault in addition to records of past performance of the virtual endpoint device. Once received at the remote support system, this data can be analyzed to improve the hardware endpoint device(s) represented by the virtual endpoint device.

In some implementations, when the virtual endpoint device transmits a fault notification, the computing system which hosts the virtual endpoint software system may issue an alert that is visualized on a graphical user interface or other peripheral device component of the computing system. The alerts may gain the attention of a user which may analyze the causes of the faulting condition.

As will be appreciated by one skilled in the art, the present disclosure may be embodied as a system, method or computer program product. Accordingly, the present disclosure may take the form of an entirely hardware embodiment, a software embodiment (including firmware, resident software, micro-code, etc.) stored in a storage device, or an embodiment combining software and hardware aspects that may all generally be referred to herein as a "circuit," "module," or "system." Furthermore, the present disclosure may take the form of a computer program product embodied in any storage device having computer readable program code embodied in the medium. A storage device for storing computer readable program code does not encompass a signal propagation media such as copper cable, optical fiber or wireless transmission media.

Any combination of one or more computer-readable storage device may be utilized. The computer-readable storage device may be, for example but not limited to, an electronic, magnetic, optical, electromagnetic, infrared, or semiconductor system, apparatus, or device. More specific examples (a non-exhaustive list) of the computer-readable storage device may include the following: a portable computer diskette, a hard disk, a random access memory (RAM), a read-only memory (ROM), an erasable programmable read-only memory (EPROM or flash memory), a portable compact disc read-only memory (CDROM), an optical storage device, or a magnetic storage device processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java™, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The processor includes an arithmetic logic unit, a microprocessor, a general purpose controller or some other processor array to perform computations and provide electronic display signals to a display device. Processor processes data signals and may include various computing architectures including a complex instruction set computer (CISC) architecture, a reduced instruction set computer (RISC) architecture, or an architecture implementing a combination of instruction sets. The present disclosure includes a single processor, multiple processors may be included. Other processors, operating systems, sensors, displays and physical configurations are possible. In some embodiments, the processor includes a networking processor core that is capable of processing network data traffic.

The memory stores instructions and/or data that may be executed by the processor. The instructions and/or data may include code for performing the techniques described herein. The memory may be a dynamic random access memory (DRAM) device, a static random access memory (SRAM) device, flash memory or some other memory device. In some embodiments, the memory also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The computer program instructions may also be loaded onto a computer or other programmable data processing apparatus, such as but not limited to an expansion card such as a computer expansion card (e.g., memory expansion card or personal computer card) to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

While illustrative embodiments of the application have been described in detail herein, it is to be understood that the inventive concepts may be otherwise variously embodied and employed, and that the appended claims are intended to be construed to include such variations, except as limited by the prior art.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory computer readable medium including instructions stored in memory when executed by a processor causes a computing machine to:
   send a notification that a virtual endpoint device has been added to a virtual endpoint tool, the virtual endpoint device being a virtual representation of a hardware endpoint device and the virtual endpoint tool being configured to deploy instantiations of a plurality of virtual endpoint devices on the computing machine;
   respond to a discovery request directed to the virtual endpoint device by retrieving and sending identifying and configuration information associated with the virtual endpoint device to an external device which received the notification that the virtual endpoint device has been added to the virtual endpoint tool; and
   translate the discovery request to a communication protocol that is compatible with the virtual endpoint device.

2. The non-transitory computer readable medium of claim 1, wherein the discovery request includes inquiries as to identifying and configuration information associated with the virtual endpoint device.

3. The non-transitory computer readable medium of claim 1 further comprising instructions stored in memory when executed by the processor causes the computing machine to respond to a collections request directed to the virtual endpoint device by retrieving and sending requested information in response to the collections request from a configuration file associated with the virtual endpoint device to the external device which received the notification that the virtual endpoint device has been added to the virtual endpoint tool.

4. The non-transitory computer readable medium of claim 3, wherein the collections request includes inquiries as to device functionality and operating conditions associated with the virtual endpoint device.

5. The non-transitory computer readable medium of claim 3, wherein the configuration file includes a script to execute a fault condition.

6. The non-transitory computer readable medium of claim 1, wherein the sent notification is dispatched from the virtual endpoint tool to a remote support system and further includes instructions for the remote support system to locate the virtual endpoint device.

7. The non-transitory computer readable medium of claim 1, wherein the virtual endpoint device is a virtual representation of at least one of a server, disk array, switch, and router.

8. A computing device comprising a workstation, at least one processor, and computer memory, the computing device being configured to:
respond to a discovery request by retrieving a configuration file, wherein the configuration file includes a plurality of parameters associated with the first virtual endpoint device which represent a device functionality or operating condition of a hardware endpoint device and the discovery request includes inquiries as to identifying and configuration information the first virtual endpoint device; and
predict a performance of the hardware equipment based on a result from the discovery request.

9. The computing device of claim 8, wherein the computing device collections request includes inquiries as to device functionality and operating conditions associated with the first virtual endpoint device.

10. The computing device of claim 9, wherein the collections request includes inquires as to records of historical performance associated with the first virtual endpoint device.

11. A computing system comprising a workstation, at least one processor, and memory, the computing system being configured to instantiate a virtual endpoint software system, comprising:
a virtual endpoint tool, comprising:
a plurality of virtual endpoint devices, each virtual endpoint device is a digital representation of a hardware endpoint device, each of the plurality of virtual endpoint devices is associated with at least one of a plurality of configuration files and each configuration file when executed virtually represents device functionality and operating conditions of the hardware endpoint device;
a central engine, the central engine comprising at least one processor to process instructions stored in the plurality of configuration files; and
a device manager to manage reservations, notifications, and event triggering associated with the virtual endpoint tool.

12. The computing system of claim 11, wherein the computing system is configured, via the at least one processor, to:
receive at least one of the plurality of configuration files;
process a request for the virtual endpoint tool to perform an action; and
output a performance prediction of the hardware endpoint device associated with the at least one of the plurality of configuration files based on results of the request.

13. The computing system of claim 11, wherein the virtual endpoint software system further comprises a remote support system that is to communicate with the virtual endpoint tool, the remote support system is to monitor at least one of the plurality of virtual endpoint devices during the performance of the action.

14. The computing system of claim 13, wherein the remote support system is to collect information from at least one of the plurality of virtual endpoint devices on a periodic basis.

15. The computing system of claim 11, wherein the virtual endpoint tool further comprises a protocol handler which extracts data from input packets directed to the virtual endpoint tool and inserts data into output packets dispatched from the virtual endpoint tool.

16. The computing system of claim 11, wherein the virtual endpoint tool further comprises a central manager which manages communications between the virtual endpoint tool and destination endpoints.

17. The computing system of claim 11, wherein the central engine is configured to process instructions included in at least one of the plurality of configuration files to execute a hardware fault.

* * * * *